US012418051B2

(12) United States Patent
Peng et al.

(10) Patent No.: US 12,418,051 B2
(45) Date of Patent: Sep. 16, 2025

(54) BUTTON CELL AND PREPARATION METHOD THEREOF

(71) Applicant: ZHUHAI COSMX BATTERY CO., LTD., Zhuhai (CN)

(72) Inventors: Ning Peng, Zhuhai (CN); Bin Xie, Zhuhai (CN)

(73) Assignee: ZHUHAI COSMX BATTERY CO., LTD., Zhuhai (CN)

(*) Notice: Subject to any disclaimer, the term of this patent is extended or adjusted under 35 U.S.C. 154(b) by 754 days.

(21) Appl. No.: 17/746,974

(22) Filed: May 18, 2022

(65) Prior Publication Data

US 2022/0278375 A1 Sep. 1, 2022

Related U.S. Application Data

(63) Continuation of application No. PCT/CN2021/109784, filed on Jul. 30, 2021.

(30) Foreign Application Priority Data

Aug. 4, 2020 (CN) .................... 202010771326.X

(51) Int. Cl.
*H01M 10/0587* (2010.01)
*H01M 50/536* (2021.01)
*H01M 50/538* (2021.01)

(52) U.S. Cl.
CPC ..... *H01M 10/0587* (2013.01); *H01M 50/536* (2021.01); *H01M 50/538* (2021.01)

(58) Field of Classification Search
CPC ........... H01M 10/0427; H01M 10/124; H01M 10/285; H01M 50/109; H01M 50/153;

(Continued)

(56) References Cited

U.S. PATENT DOCUMENTS

| 2005/0147878 A1 | 7/2005 | Miyahisa et al. |
| 2009/0317712 A1 | 12/2009 | Kim et al. |
| 2021/0331268 A1* | 10/2021 | Chang ................. H01M 50/538 |

FOREIGN PATENT DOCUMENTS

| CN | 1591927 A | 3/2005 |
| CN | 109860498 A | 9/2007 |

(Continued)

OTHER PUBLICATIONS

KR2020007559 English translation. Hwang et al. Korea, Jan. 22, 2020. (Year: 2020).*

(Continued)

*Primary Examiner* — Christopher P Domone
(74) *Attorney, Agent, or Firm* — Kilpatrick Townsend & Stockton LLP

(57) ABSTRACT

A button cell and a preparation method thereof, where the button cell includes a housing and a roll core; the housing includes a housing body and a top cover assembly, the housing body and the top cover assembly jointly enclose an accommodating cavity for accommodating the roll core; the roll core includes a first tab and a second tab, and the first tab is connected with a bottom wall of the housing body by welding, and the second tab is connected with the top cover; the top cover is provided with an injection hole, the injection hole at least partially overlaps with a cavity of the roll core; a welding mark between the first tab and the bottom wall is located in a portion where the bottom wall overlaps with the cavity and the injection hole.

16 Claims, 6 Drawing Sheets

(58) Field of Classification Search
CPC ............ H01M 50/216; H01M 50/559; H01M 50/538; H01M 50/536
See application file for complete search history.

(56) References Cited

FOREIGN PATENT DOCUMENTS

| | | | |
|---|---|---|---|
| CN | 101083339 | A | 12/2007 |
| CN | 101944575 | A | 1/2011 |
| CN | 204834764 | U | 12/2015 |
| CN | 106159350 | A | 11/2016 |
| CN | 108857067 | A | 11/2018 |
| CN | 208819999 | U | 5/2019 |
| CN | 208873784 | U | 5/2019 |
| CN | 209658289 | U | 11/2019 |
| CN | 111162324 | A | 5/2020 |
| CN | 111370600 | A | 7/2020 |
| CN | 111430588 | A | 7/2020 |
| CN | 111446386 | A | 7/2020 |
| CN | 111816907 | A | 10/2020 |
| CN | 111900275 | A | 11/2020 |
| JP | 2009277429 | A | 11/2009 |
| JP | 2019149251 | A | 9/2019 |
| KR | 20020082729 | A | 10/2002 |
| KR | 20050080516 | A | 8/2005 |
| KR | 20170050440 | A | 5/2017 |
| KR | 2020007559 | * | 1/2020 |
| WO | 2019004039 | A1 | 1/2019 |

OTHER PUBLICATIONS

The second Office Action mailed Feb. 25, 2023 in corresponding Chinese application 202110880718.4.
Notice of Allowance of Chinese Patent Application No. 202110880718.4 Dated Dec. 4, 2023.
Notice of Rejection received in the corresponding Chinese application 202110880718.4, mailed Aug. 5, 2023.
European Search Report of EP 21852823.0 Dated Aug. 16, 2024.
The first Office Action mailed May 19, 2022 in corresponding Chinese application 202110880718.4.
International Search Report and Written Opinion mailed Sep. 30, 2021 in PCT/CN2021/109784.

* cited by examiner

BUTTON CELL AND PREPARATION METHOD THEREOF

CROSS-REFERENCE TO RELATED APPLICATIONS

This application a continuation of International Application No. PCT/CN2021/109784, filed on Jul. 30, 2021, which claims priority to Chinese Patent Application No. 202010771326.X filed with China National Intellectual Property Administration on Aug. 4, 2020 and titled "BUTTON CELL AND PREPARATION METHOD THEREOF". The disclosures of the aforementioned applications are incorporated herein by reference in their entireties.

TECHNICAL FIELD

The present disclosure relates to the technical field of lithium batteries and, in particular, to a button cell and a preparation method thereof.

BACKGROUND

Button cells, which are cells that are shaped like a button, generally have a large diameter and a thin thickness. The button cells are divided into two categories: chemical cells and physical cells, where the chemical cells are the most widely used, and are mainly composed of an anode, a cathode and an electrolyte thereof.

Due to their small size, the button cells have been widely used in a wide range of small and miniature electronic products, for example, computer main boards, earphones, electronic watches, electronic dictionaries, electronic scales, remote controls, electric toys, cardiac pacemakers, electronic hearing aids, counters, cameras, etc. With the increasing demand for the button cells, a manufacturing process of the button cells has also received more and more attentions.

However, in the process of manufacturing the existing button cells, when welding a tab and a housing body, the roll core is easy to be accidentally damaged, causing unqualified quality and performance of the button cells, thereby reducing the yield of the button cells.

SUMMARY

The present disclosure provides a button cell and a preparation method thereof. When welding between a tab and a housing body of the button cell of the present disclosure, it is not easy to accidentally damage the roll core, which can ensure that the quality and performance of the button cell can meet the requirements, and the yield of the button cell can be improved.

In a first aspect, the present disclosure provides a button cell including a housing and a roll core;
   the housing includes a housing body and a top cover assembly, where the housing body includes a bottom wall and a side enclosure wall provided along an outer edge of the bottom wall and extending upward, the top cover assembly is covered on a top of the side enclosure wall and sealed with the side enclosure wall, and the housing body and the top cover assembly jointly enclose an accommodating cavity for accommodating the roll core;
   the roll core includes a positive sheet and a negative sheet, a cavity is formed in a center of the roll core, one of the positive sheet and the negative sheet is provided with a first tab extending toward a direction of the bottom wall, and the other of the positive sheet and the negative sheet is provided with a second tab extending toward a direction opposite to the direction of the bottom wall, the first tab is welded to the bottom wall of the housing body, and the second tab is welded to an inner side of the top cover assembly; and
   the top cover assembly is provided with an injection hole, the injection hole at least partially overlaps with the cavity of the roll core; a welding mark between the first tab and the bottom wall is located in a part where the bottom wall overlaps with the cavity and the injection hole.

The button cell of the present disclosure includes the housing and the roll core, the housing includes the housing body and the top cover assembly, the housing body and the top cover assembly jointly enclose the accommodating cavity for accommodating the roll core, the roll core includes the positive sheet, the negative sheet, the first tab and the second tab, the first tab is welded to the bottom wall of the housing body, and the second tab is connected with the top cover assembly, so that the roll core can output electric energy to outside through the housing body or the top cover assembly or receive electric energy inputted from outside. By providing the injection hole on the top cover assembly, at least partially overlapping the injection hole with the cavity of the roll core, and meanwhile providing that the welding area between the first tab and the bottom wall of the housing body at least partially overlaps with the cavity of the roll core, the welding area between the first tab of the button cell and the bottom wall of the housing body can be exposed to the field of vision through the injection hole and the cavity of the roll core, so that in the process of manufacturing the button cell, a welding equipment can directly pass through the injection hole of the top cover assembly and the cavity of the roll core so as to weld the first tab and the bottom wall of the housing body together, that is, the welding mark of the first tab and the bottom wall is located in a part where the bottom wall overlaps with the cavity and the injection hole.

Compared with a method of welding a first tab and a bottom wall of a housing body from top to bottom before a top cover is closed in the prior art, in the button cell of the present disclosure, after the top cover assembly is covered on the housing body, the welding equipment is passed through the injection hole of the top cover assembly and the cavity of the roll core so as to weld the first tab and the bottom wall of the housing body together. At this time, the existence of the top cover assembly can protect the roll core to a certain extent, which is beneficial to avoiding the welding equipment to accidentally damage the roll core during the welding process, thereby beneficial to ensuring that the quality and performance of the button cell meet the requirements, and thus beneficial to improvement of the yield of the button cell.

In the button cell as described above, optionally, a distance from the top of the side enclosure wall to the welding mark is greater than a length from an end point of the first tab out of the roll core to the welding mark.

In the button cell as described above, optionally, a welding area of the first tab facing away from the bottom wall of the housing body has a welding mark, and a welding area of the bottom wall of the housing body facing away the first tab is a smooth surface.

In the button cell as described above, optionally, a welding area of the bottom wall of the housing body facing away from the first tab has a welding mark, and a welding area of the first tab facing away the bottom wall of the housing body is a smooth surface.

In the button cell as described above, optionally, the bottom wall of the housing body and the top cover assembly together clamp the roll core in the accommodating cavity.

In the button cell as described above, optionally, the cavity of the roll core is provided with an insulation hollow pipe therein, a top of the insulation hollow pipe abuts against the top cover assembly, and a bottom of the insulation hollow pipe abuts against the first tab; and the injection hole at least partially overlaps with a top opening of the insulation hollow pipe.

In the button cell as described above, optionally, the insulation hollow pipe is a rubber hollow pipe; and/or the insulation hollow pipe is provided with a through hole on a pipe wall thereof.

In the button cell as described above, optionally, the insulation hollow pipe, the injection hole and the cavity of the roll core are arranged coaxially, and an inner diameter of the insulation hollow pipe is greater than a diameter of the injection hole.

In the button cell as described above, optionally, the top cover assembly includes an upper cover and a top cover;
- an outer edge of the upper cover is welded to the side enclosure wall, an inner edge of the upper cover is lapped to an outer edge of the top cover, and an insulation seal is sandwiched between the inner edge of the upper cover and the outer edge of the top cover; and
- the second tab is welded to an inner side of the top cover, and the injection hole is located on the top cover.

In the button cell as described above, optionally, a seam where the upper cover and the top cover are lapped is coated with a sealant.

In the button cell as described above, optionally, the bottom wall of the housing body protrudes downward to form a convex surface.

In a second aspect, the present disclosure provides a preparation method of a button cell including:
- providing a housing, where the housing includes a housing body and a top cover assembly, the housing body includes a bottom wall and a side enclosure wall provided along an outer edge of the bottom wall and extending upward, and the top cover assembly is provided with an insulation seal;
- providing a roll core, where the roll core includes a positive sheet and a negative sheet, which are provided in a laminated manner, a cavity is formed in a center of the roll core, one of the positive sheet and the negative sheet is provided with a first tab, the other of the positive sheet and the negative sheet is provided with a second tab, and the second tab and the first tab extend in opposite directions;
- welding the second tab of the roll core to an inner side of the top cover assembly;
- placing the roll core into the housing body, where the first tab of the roll core extends toward the bottom wall and contacts the bottom wall;
- covering the top cover assembly on a top of the side enclosure wall and sealing it with the side enclosure wall, where the top cover assembly is provide with an injection hole, the injection hole at least partially overlaps with the cavity of the roll core; and
- welding the first tab to the bottom wall of the housing body by a welding equipment, where energy emitted by the welding equipment or an auxiliary tool of the welding equipment passes through the injection hole and the cavity of the roll core.

The preparation method of a button cell as described above, optionally, the top cover assembly is covered on the top of the side enclosure wall and the sealing of the top cover assembly to the side enclosure wall is laser welding sealing.

In the preparation method of the button cell of the present disclosure, the top cover assembly is covered on the top of the side enclosure wall, and is sealed to the side enclosure wall, and meanwhile the top cover assembly is provide with the injection hole, and the injection hole at least partially overlaps with a cavity of the roll core; and the first tab is welded to the bottom wall of the housing body by the welding equipment, where energy emitted by the welding equipment or the auxiliary tool of the welding equipment passes through the injection hole and the cavity of the roll core. Compared with a method of welding a first tab to a bottom wall of a housing body from top to bottom before a top cover is closed in the prior art, in the welding method of the present disclosure, on one hand, the existence of the top cover assembly can protect the roll core to a certain extent, which avoids the welding equipment to accidentally damage the roll core during the welding process, thereby beneficial to ensuring that the quality and performance of the button cell meet the requirements, and thus beneficial to improvement of the yield of the button cell.

In the preparation method of the button cell as described above, optionally, the welding equipment is a resistance welding equipment, and a welding pin of the resistance welding equipment passes through the injection hole and the cavity of the roll core, and presses and welds the first tab onto and to the bottom wall of the housing body.

When the welding equipment is the resistance welding equipment, the welding pin of the resistance welding equipment can pass through the injection hole and the cavity of the roll core to press the first tab and the bottom wall of the housing body, so that the reliability of the welding between the first tab and the bottom wall of the housing body can be ensured, which avoids a pseudo welding caused by insufficient attachment between the first tab and the bottom wall of the housing body, and is beneficial to ensuring the quality and performance of the button cell.

In the preparation method of the button cell as described above, optionally, the welding equipment includes a laser welding equipment and a hollow pipe, the hollow pipe passes through the injection hole and the cavity of the roll core, and presses the first tab onto the bottom wall of the housing body; laser emitted by the laser welding equipment passes through an inner cavity of the hollow pipe and is irradiated on the first tab to weld the first tab and the bottom wall of the housing body together.

In the preparation method of the button cell as described above, optionally, the welding equipment includes a laser welding equipment and a welding auxiliary part, the welding auxiliary part passes through the injection hole and the cavity of the roll core, and presses the first tab on the bottom wall of the housing body; and the laser welding equipment performs welding from a bottom of the housing body to weld the bottom wall of the housing body to the first tab.

When the welding equipment is the laser welding equipment, the hollow pipe and the welding auxiliary part can pass through the injection hole and the cavity of the roll core to press the first tab and the bottom wall of the housing body, so that the reliability of the welding between the first tab and the bottom wall of the housing body can be ensured, which avoids a pseudo welding caused by insufficient attachment between the first tab and the bottom wall of the housing body, and is beneficial to ensuring the quality and performance of the button cell.

The method where the laser emitted by the laser welding equipment directly passes through the injection hole and the cavity of the roll core and is irradiated on the first tab, compared with a method of welding a first tab and a bottom wall of a housing body from top to bottom before a top cover is closed in the prior art, has advantages as follows:

on one hand, the existence of the top cover assembly can protect the roll core to a certain extent, which avoids the welding equipment to accidentally damage the roll core during the welding process, thereby beneficial to ensuring that the quality and performance of the button cell meet the requirements, and beneficial to improvement of the yield of the button cell; and on the other hand, the welding process is convenient and fast, which beneficial to improvement of the processing efficiency of the button cell.

In a third aspect, the present disclosure provides an electronic product including the button cell as described above.

The electronic product of the present disclosure includes the button cell, the button cell includes the housing and the roll core, the housing includes the housing body and the top cover assembly, the housing body and the top cover assembly jointly enclose the accommodating cavity for accommodating the roll core, the roll core includes the first tab and the second tab, the first tab is welded to the bottom wall of the housing body, and the second tab is connected with the top cover, so that the roll core can output electric energy to outside through the housing body and the top cover assembly or receive electric energy inputted from the outside. By providing the injection hole on the top cover assembly, at least partially overlapping the injection hole with the cavity of the roll core, and meanwhile by arranging the welding area between the first tab and the bottom wall of the housing body to at least partially overlap with the cavity of the roll core, the welding area between the first tab of the button cell and the bottom wall of the housing body can be exposed to the field of vision through the injection hole and the cavity of the roll core, so that in the process of manufacturing the button cell, the welding equipment can directly pass through the injection hole of the top cover assembly and the cavity of the roll core to weld the first tab and the bottom wall of the housing body together, that is, the welding mark between the first tab and the bottom wall is located in a part where the bottom wall overlaps with the cavity and the injection hole.

Compared with a method of welding a first tab to a bottom wall of a housing body from top to bottom before a top cover is closed in the prior art, in the present disclosure, after installing the button cell to the top cover assembly, a portion of the welding equipment passes through the injection hole of the top cover assembly and the cavity of the roll core to press the first tab and the bottom wall of the housing body, then energy of the welding equipment is transferred from the injection hole and the cavity to the first tab for welding, and at this time, the existence of the top cover assembly can protect the roll core to a certain extent, which beneficial to avoiding the welding equipment to accidentally damage the roll core during the welding process, thereby beneficial to ensuring that the quality and performance of the button cell meet the requirements, and beneficial to improvement of the yield of the button cell.

BRIEF DESCRIPTION OF DRAWINGS

In order to more clearly illustrate technical solutions in embodiments of the present disclosure or in the prior art, drawings that need to be used in the description of the embodiments or the prior art will be briefly introduced below. Obviously, the drawings in the following description are some of embodiments of the present disclosure, and for those of ordinary skill in the art, other drawings may also be obtained from these drawings without any creative work.

DESCRIPTION OF REFERENCE NUMBERS

Figure 1:
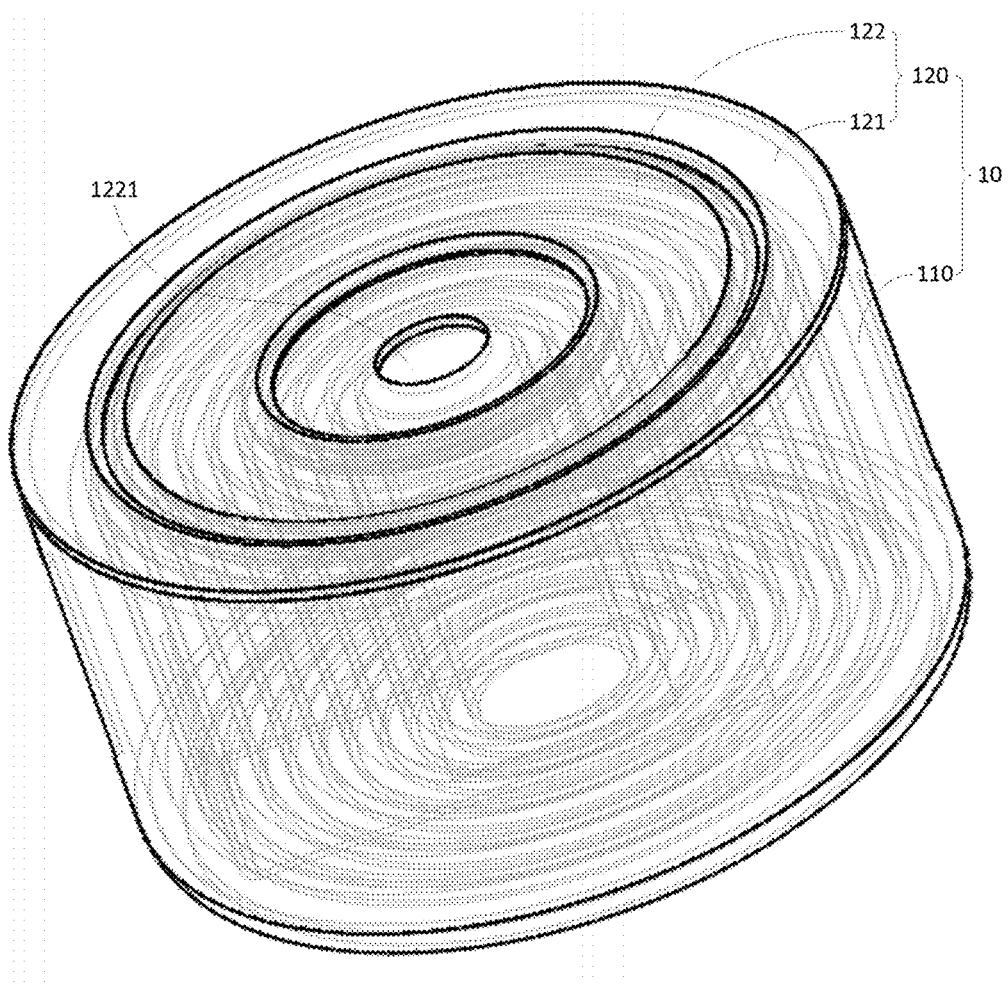
FIG. 1 is a schematic structural diagram of a button cell provided by Embodiment 1 of the present disclosure.

10—housing;
110—housing body;
111—bottom wall;
120—top cover assembly;
121—upper cover;
122—top cover;
1221—injection hole;
123—insulation seal;
20—roll core;
210—first tab;
220—second tab;
230—cavity;
240—insulation hollow pipe;
30—hollow pipe; and
310—inner cavity.

DETAILED DESCRIPTION

Button cell, which is also known as a button battery, refers to a battery that is shaped like a small button. Compared with a cylindrical battery, the button cell has a larger diameter and a thinner thickness. Due to small size, the button cell has been widely used in various micro-electronic products, for example, computer main boards, electronic watches, electronic dictionaries, electronic scales, remote controls, electric toys, cardiac pacemakers, electronic hearing aids, counters, cameras, etc.

The button cell is mainly composed of a housing and a roll core located in the housing. The housing includes a housing body and a top cover assembly, where the housing body includes a bottom wall and a side enclosure wall that surrounds an outer edge of the bottom wall and extends upwards, and the top cover assembly is covered on the top of the side enclosure wall and seals the side enclosure wall, so that an accommodating cavity for accommodating the roll core is defined between the top cover assembly and the housing body.

The top cover assembly includes an upper cover with a center hole and a top cover covered at the center hole, and an injection hole is provided at the center of the top cover, in other words, the upper cover extends from the top of the side enclosure wall towards a direction of the central axis of the housing body, and the upper cover is provided with the center hole surrounding the central axis of the housing body, the top cover is covered on the center hole, and the top cover is sealed to the upper cover. In some implementations, the top cover and the upper cover are welded together, and thus have the same electrical polarity, and the upper cover is insulated from and sealed with the side enclosure wall through an insulation seal; in some other implementations, the upper cover and the side enclosure wall are welded together, and the top cover is insulated from and sealed with the upper cover through an insulation seal, so that the top cover and the upper cover have opposite electrical polarities.

The roll core is mainly formed by winding a positive sheet, a first diaphragm, a negative sheet and a second diaphragm provided in a laminated manner, and a cavity at least partially overlapping with the center hole is formed in the center of the roll core.

The accommodating cavity is also filled with an electrolyte, and the positive sheet is provided with a positive tab, the negative sheet is provided with a negative tab, one of the two tabs is welded with the bottom wall of the housing body, and the other is welded with the top cover.

In the process of manufacturing the button cell, there are two main operation methods for welding the tab of the roll core with the bottom wall of the housing body, where a first operation method is to first weld the tab with the housing body, and then place the roll core into the housing body; and a second operation method is to first place the roll core into the housing body, and then weld the tab with the housing body.

For the second operation method, in a specific operation, the roll core is first put into the housing body, and then the tab and the housing body are welded together from top to bottom using a welding equipment, and during the welding process, since the top of the roll core has no protection, when the roll core shakes, the welding equipment may easily cause accidental damage to the roll core, which may lead to unqualified quality and performance of the button cell, reducing the yield of the button cell and also reducing the production efficiency of the button cell.

In order to solve the above technical problem, the present disclosure provides a button cell, in the button cell, by providing an injection hole on the top cover assembly, at least partially overlapping the injection hole with the cavity of the roll core, and meanwhile, at least partially overlapping a welding area between the first tab and the bottom wall of the housing body with the cavity of the roll core, the welding area between the first tab of the button cell and the bottom wall of the housing body can be exposed to the field of vision through the injection hole and the cavity of the roll core, so that a welding equipment can directly pass through the injection hole of the top cover and the cavity of the roll core to weld the first tab and the bottom wall of the housing body together, that is, a welding mark between the first tab and the bottom wall is located in a part where the bottom wall overlaps with the cavity and the injection hole.

Moreover, the top cover assembly can protect the roll core to a certain extent, to avoid the welding equipment to accidentally damage to the roll core during the welding process, which can ensure that the quality and performance of the button cell meet the requirements, beneficial to improving the yield of the button cell, and at the same time beneficial to improving the production efficiency of button cell.

In order to make purposes, technical solutions and advantages of the embodiments of the present disclosure clearer, the technical solutions in the embodiments of the present disclosure would be clearly and completely described below in combination with the drawings in the embodiments of the present disclosure. Obviously, the described embodiments are a part of embodiments of the present disclosure, not all embodiments. Based on the embodiments of the present disclosure, all other embodiments obtained by those of ordinary skill in the art without creative work belong to the protection scope of the present disclosure.

Embodiment 1

Figure 2:
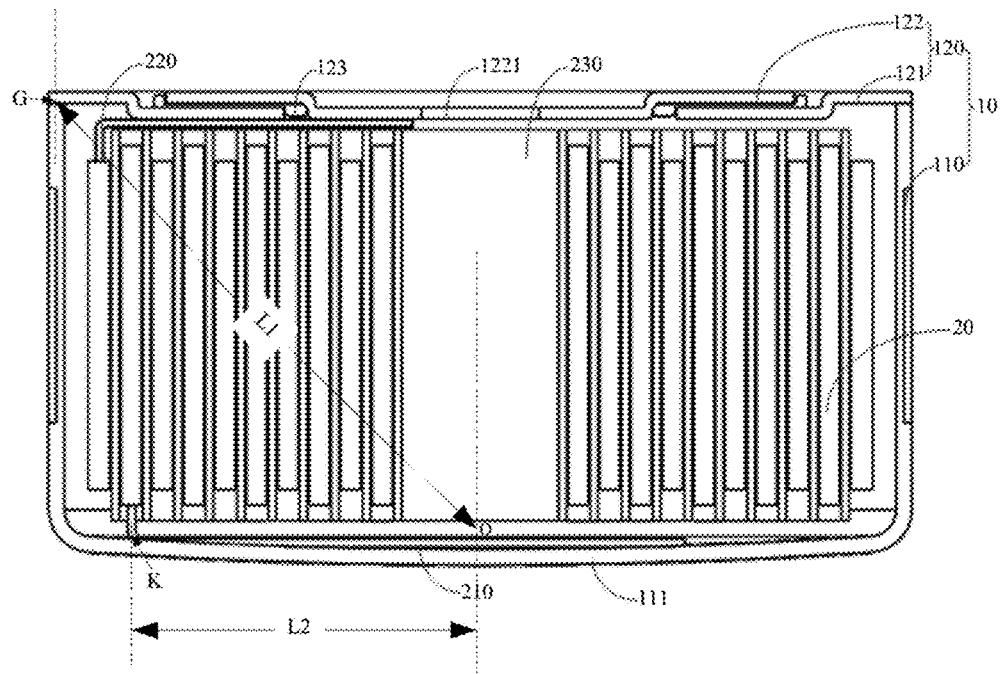
FIG. 2 is a cross-sectional view 1 of the button cell provided by Embodiment 1 of the present disclosure.
Figure 3:
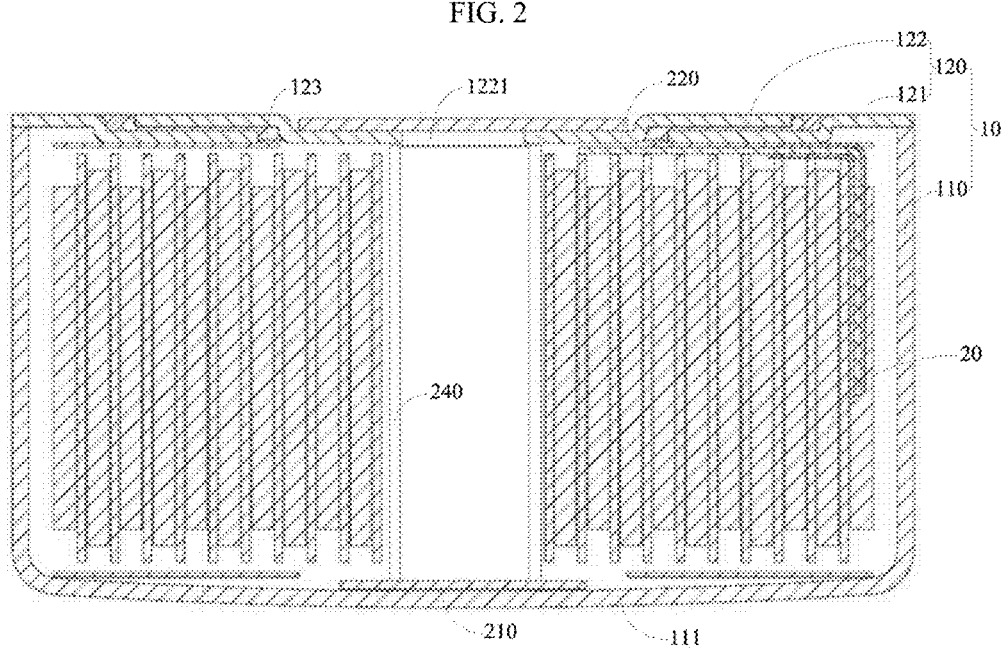
FIG. 3 is a cross-sectional view 2 of the button cell provided by Embodiment 1 of the present disclosure.

FIG. 1 is a schematic structural diagram of a button cell provided by Embodiment 1 of the present disclosure; FIG. 2 is a cross-sectional view 1 of the button cell provided by Embodiment 1 of the present disclosure; FIG. 3 is a cross-sectional view 2 of the button cell provided by Embodiment 1 of the present disclosure.

Referring to FIG. 1 to FIG. 3, this embodiment provides a button cell, the button cell includes a housing 10 and a roll core 20. Specifically, the housing 10 includes a housing body 110 and a top cover assembly 120, the housing body 110 and the top cover assembly 120 jointly enclose an accommodating cavity for accommodating the roll core 20.

Where the housing body 110 includes a bottom wall 111 and a side enclosure wall provided along an outer edge of the bottom wall 111 and extending upwards. The bottom wall 111 of the housing body 110 may protrude downward to form a convex surface. Exemplarily, the convex surface may be a conical surface, or a spherical surface, or may be a convex surface in any other shape. The setting of the convex surface can increase the internal space of the button cell, which beneficial to improvement of the cycle performance of the button cell.

Where the top cover assembly 120 includes an upper cover 121 and a top cover 122. The upper cover 121 extends from the top of the side enclosure walls towards a direction of the central axis of the housing body 110, a center hole surrounding the central axis of the housing body 110 is provided at a center of the upper cover 121, and the top cover 122 is covered on the center hole and sealed with the upper cover 121. Specifically, an outer edge of the upper cover 121 may be connected with the housing body 110 by welding, an inner edge of the upper cover 121 is lapped with the outer edge of the top cover 122, and an insulation seal 123 is sandwiched between the inner edge of the upper cover 121 and the outer edge of the top cover 122.

Further, a seam where the upper cover 121 is lapped with the top cover 122 may be coated with a sealant, thereby further ensuring the sealing of the top cover assembly 120.

Based on the above, the housing 10 includes two parts that are insulated from and connected by the insulation seal 123, where one part is the housing body 110 and the upper cover 121, and the other part is the top cover 122. Of course, in other cases, it may also be that the housing body 110 is one part, and the upper cover 121 and the top cover 122 are the other part.

Continue to refer to FIG. 1 to FIG. 3, the roll core 20 includes a positive sheet, a negative sheet and a diaphragm for separating the positive sheet from the negative sheet; a positive tab is welded on the positive sheet, and a negative tab is welded on the negative sheet; during the winding process, the positive sheet, the diaphragm and the negative sheet are wound from the head end of the winding in the same direction and finally form a wound cell core, and a cavity 230 is formed in the middle of the wound cell core. The positive tab and the negative tab of the roll core 20 are connected and conducted with the two parts of the housing that are insulated from each other, respectively, so that the roll core 20 can output electric energy to outside through the housing 10, or receive electric energy inputted from outside through the housing 10.

That is, the roll core 20 of this embodiment includes a first tab 210 and a second tab 220, where the first tab 210 is the positive tab and the second tab 220 is the negative tab; or the first tab 210 is the negative tab and the second tab 220 is the positive tab.

Where the first tab 210 is connected to the bottom wall 111 of the housing body 110 by welding, and the second tab 220 is electrically connected to the top cover 112 having an opposite electrical polarity to the housing body 110 in the top cover assembly 120.

Exemplarily, when the upper cover 121 and the top cover 122 have opposite electrical polarities, the second tab 220 may be connected with the top cover 122 in the top cover assembly 120 by welding; and when the upper cover 121 and the top cover 122 have the same electrical polarity, the second tab 220 may be welded with any one of the top cover 122 and the upper cover 121. Of course, the second tab 220 may also be connected with the top cover 122 or the upper cover 121 by other means, as long as it can ensure the electrical conductivity after connection.

Further, an injection hole 1221 is provided on the top cover 122, the injection hole 1221 at least partially overlaps with the cavity 230 of the roll core 20; a welding area between the first tab 210 and the bottom wall 111 of the housing body at least partially overlaps with the cavity 230 of the roll core 20, so that the welding area between the first tab 210 of the button cell and the bottom wall 111 of the housing body can be exposed to the field of vision through the injection hole 1221 and the cavity 230 of the roll core 20.

Exemplarily, when assembling the button cell, the roll core 20 is firstly put into the housing body 110, so that the first tab 210 is attached to the bottom wall 111 of the housing body 110, and the second tab 220 is welded with an inner side of the top cover assembly 120; then the top cover assembly 120 attached with an insulating sealing rubber ring is covered on the top of the side enclosure wall of the housing body 110, and welded with the side enclosure wall, thereby realizing a sealing connection between the top cover assembly 120 and the housing body 110. Next, a part of the welding equipment passes through the injection hole 1221 and the cavity 230 of the roll core 20, so as to press the first tab 210 against the bottom wall 111 of the housing body 110, and then a main working part of the welding equipment produces energy enough to melt the attaching surface between the first tab 210 and the bottom wall 111, thereby welding the first tab 210 and the bottom wall 111 of the housing body 110 together. The top cover assembly 120 can protect the top of the roll core 20 from being accidentally damaged by the welding equipment during the welding process.

Optionally, a distance L1 from the top of the side enclosure wall of the housing body 110 to the welding mark 211 is greater than a length L2 from an end point of the first tab 210 out of the roll core 20 to the welding mark 211. Exemplarily, in FIG. 2, the top of the side enclosure wall is indicated by G, the end point of the first tab 210 out of the roll core 20 is indicated by K, and the welding mark 211 is indicated by O. FIG. 2 shows that the first tab 210 is provided outside the roll core 20, so that the end point K of the first tab 210 out of the roll core 20 is also correspondingly located outside the roll core 20.

The button cell of this embodiment includes the housing 10 and the roll core 20, the housing 10 includes the housing body 110 and the top cover assembly 120, and the housing body 110 and the top cover assembly 120 jointly enclose the accommodating cavity for accommodating the roll core 20, the roll core 20 includes the first tab 210 and the second tab 220, the first tab 210 is connected with the bottom wall 111 of the housing body 110 by welding, and the second tab 220 is connected with the top cover assembly 120, so that the roll core 20 can output electric energy to outside through the housing body 10 or the top cover assembly 120 or receive electric energy inputted from outside. By providing the injection hole 1221 on the top cover 122, allowing the injection hole 1221 to at least partially overlap with the cavity 230 of the roll core 20, and meanwhile allowing the welding area between the first tab 210 and the bottom wall 111 of the housing body to at least partially overlap with the cavity 230 of the roll core 20, the welding area between the first tab 210 of the button cell and the bottom wall 111 of the housing body can be exposed to the field of vision through the injection hole 1221 and the cavity 230 of the roll core 20, so that in the process of manufacturing the button cell, the welding equipment can directly pass through the injection hole 1221 of the top cover 122 and the cavity 230 of the roll core 20 to weld the first tab 210 and the bottom wall 111 of the housing body 110 together, that is, the welding mark between the first tab 210 and the bottom wall 111 is located in a part where the bottom wall 111 overlaps with the cavity 230 and the injection hole 1221.

Compared with a method of welding a first tab and a bottom wall of a housing body from top to bottom before a top cover is closed in the prior art, in the button cell of this embodiment, after the top cover assembly 120 is closed, the welding equipment passes through the injection hole 1221 of the top cover 122 and the cavity 230 of the roll core 20 to weld the first tab 210 and the bottom wall 111 of the housing body together, and in the case, the existence of the top cover assembly 120 can protect the roll core 20 to a certain extent, which beneficial to avoiding the welding equipment to accidentally damage the roll core 20 during the welding process, thereby beneficial to ensuring that the quality and performance of the button cell meet the requirements, and beneficial to improvement of the yield of the button cell.

In an implementation, a welding area of the first tab 210 facing away from the bottom wall 111 of the housing body has a welding mark, and a welding area of the bottom wall 111 of the housing body facing away from the first tab 210 is a smooth surface.

In a specific implementation, the welding equipment may weld the first tab 210 and the bottom wall 111 of the housing body 110 downward from the top of the button cell. Exemplarily, the welding equipment may be a resistance welding equipment, and a welding pin of the resistance welding equipment may pass through the injection hole and the cavity of the roll core and abut against the first tab to weld the first tab to the bottom wall of the housing body; or the welding equipment may also be a laser welding equipment, and laser emitted by the laser welding equipment may directly pass through the injection hole and be irradiated on the first tab to weld the first tab to the bottom wall of the housing body.

When the welding equipment welds the first tab 210 to the bottom wall 111 of the housing body 110 downward from the top of the button cell, the welding mark is formed in the welding area of the first tab 210 facing away from the bottom wall 111 of the housing body, while the welding area of the bottom wall 111 of the housing body facing away from the first tab 210 is a smooth surface, that is, the welding mark can only be observed from inside of the housing body 110, and the welding mark does not extend to the surface of the bottom wall 111 of the housing body facing away from the first tab 210, that is, there is no welding mark on an outer surface of the bottom wall 111 of the housing body. Therefore, the outer surface of the welding area of the bottom wall 111 of the housing body still maintains the outer surface of the bottom wall 111 of the housing body to be in a state before welding, i.e., a state where the surface is smooth, so that after the button cell is assembled in the electronic product, the smooth surface of the housing body of the button cell can maintain a good contact with a conductive area of the electronic product to ensure an electrical connection effect between the button cell and the electronic product, thereby beneficial to improvement of the energy transfer efficiency between the button cell and the electronic product.

In another implementation, the welding area of the bottom wall 111 of the housing body facing away from the first tab 210 has a welding mark, and the welding area of the first tab 210 facing away from the bottom wall 111 of the housing body is a smooth surface.

In a specific implementation, the welding equipment may weld the bottom wall 111 of the housing body 110 and the first tab 210 together upward from the bottom of the button cell. Exemplarily, the welding equipment may be a laser welding equipment, and the laser welding equipment may include an auxiliary welding part, the auxiliary welding part may pass through the injection hole and the cavity of the roll core and then abut against the first tab to press the first tab against the bottom wall of the housing body, and laser emitted by the laser welding equipment may be irradiated on the outer surface of the housing body upward from the bottom of the button cell so as to weld the bottom wall of the housing body and the first tab together.

When the welding equipment welds the bottom wall 111 of the housing body 110 and the first tab 210 together from the bottom of the button cell upward, the welding mark is formed in the welding area of the bottom wall 111 of the housing body facing away from the first tab 210, while the welding area of the first tab 210 facing away from the bottom wall 111 of the housing body is a smooth surface, that is, the welding mark can only be observed from the outer surface of the housing body 110, and the welding mark does not extend to the surface of the first tab 210 facing away from the bottom wall 111 of the housing body, that is, there is no welding mark on the surface of the first tab 210. Therefore, the surface of the welding area of the first tab 210 still maintains the surface of the first tab 210 to be in a state before welding, that is, a state where the surface is smooth, so that the welding mark on the tab can be prevented from adversely affecting the roll core, and further it is beneficial to improvement of the quality and safety performance of the button cell.

Further, the bottom wall 111 of the housing body 110 and the top cover assembly 120 jointly clamp the roll core 20 in the accommodating cavity to prevent the roll core 20 from shaking during the welding process, thereby further preventing the welding equipment from accidentally damaging the roll core, thereby ensuring that the quality and performance of the button cell meet the requirements, which is beneficial to improvement of the yield of the button cell, and meanwhile beneficial to improvement of the production efficiency of the button cell.

Referring to FIG. 3, an insulation hollow pipe 240 is sleeved in the cavity 230 of the roll core 20, the top of the insulation hollow pipe 240 abuts against the top cover assembly 120, and the bottom of the insulation hollow pipe 240 abuts against the first tab 210; and the injection hole 1221 at least partially overlaps with a top opening of the insulation hollow pipe 240, so that the welding area between the first tab 210 of the button cell and the bottom wall 111 of the housing body can be exposed to the field of vision through the injection hole 1221 and the insulation hollow pipe 240, and thus in the process of manufacturing the button cell, the welding equipment can directly pass through the injection hole 1221 of the top cover assembly 120 and the insulation hollow pipe 240 to weld the first tab 210 and the bottom wall 111 of the housing body 110 together. At the same time, the insulation hollow pipe 240 can protect the inner wall of the cavity 230 of the roll core 20 to prevent the welding equipment from accidentally damaging the inner wall of the cavity 230 of the roll core.

Exemplarily, the insulation hollow pipe 240 may be a rubber hollow pipe, and the rubber hollow pipe has an insulating property, so that a short circuit inside the button cell can be avoided; of course, the insulation hollow pipe 240 may also be made of other insulating material, as long as it meets requirements of this embodiment, and details will not be described here.

Further, a pipe wall of the insulation hollow pipe 240 is provided with a through hole, and there may be multiple through holes, so that it can be ensured that the electrolyte injected into the button cell can fully infiltrate the roll core.

Referring to FIG. 3, in an implementation, the insulation hollow pipe 240, the injection hole 1221 and the cavity 230 of the roll core 20 may be arranged coaxially, and an inner diameter of the insulation hollow pipe 240 is larger than a diameter of the injection hole 1221, so that the top of the injection hole 240 abuts against the top cover around the injection hole 1221. In this way, on one hand, the injection hole 1221 and the insulation hollow pipe 240 can sufficiently expose the first tab 210 at the bottom of the insulation hollow pipe 240 to the field of vision, so that the first tab 210 and the bottom wall 111 of the housing body are subsequently welded together; on the other hand, the injection hole 1221 is completely located inside the insulation hollow pipe 240, that is, the insulation hollow pipe 240 separates the injection hole 1221 from the inner wall of the cavity 230 of the roll core, so that the inner wall of the cavity 230 of the roll core can be prevented from being damaged in the process of sealing the injection hole 1221 with a sealing nail.

In other implementations, any two of the insulation hollow pipe 240, the injection hole 1221, and the cavity 230 of the roll core 20 may be set to be coaxial or all three of them are set to be different axes according to actual needs, as long as it can meet the requirements of this embodiment, and details are not described here.

Embodiment 2

Figure 4:
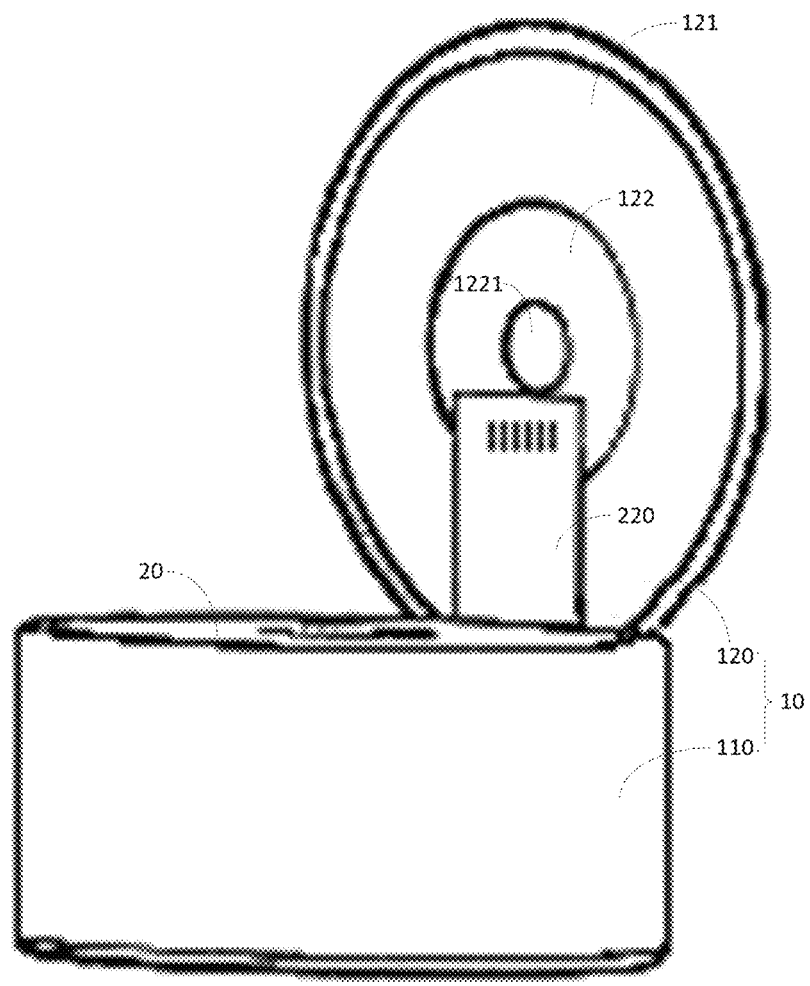
FIG. 4 is a schematic structural diagram of a second tab welded to a top cover and placed into a housing body as provided by Embodiment 2 of the present disclosure.
Figure 5:
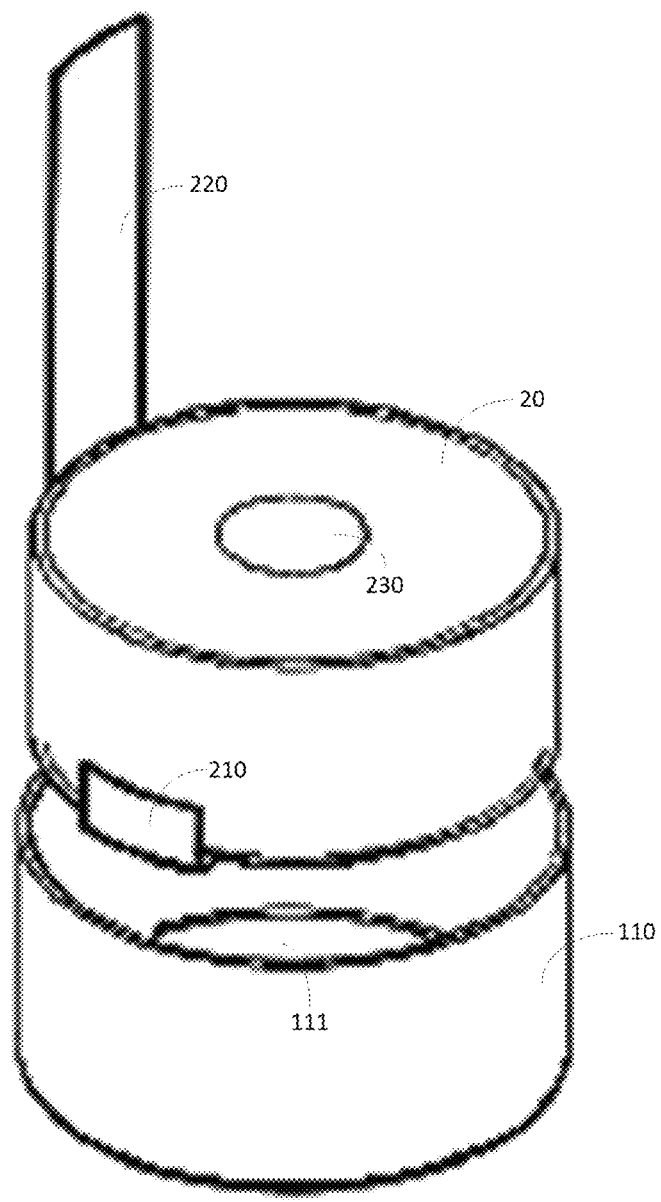
FIG. 5 is a schematic view of a process of loading a roll core into the housing body as provided by Embodiment 2 of the present disclosure.
Figure 6:
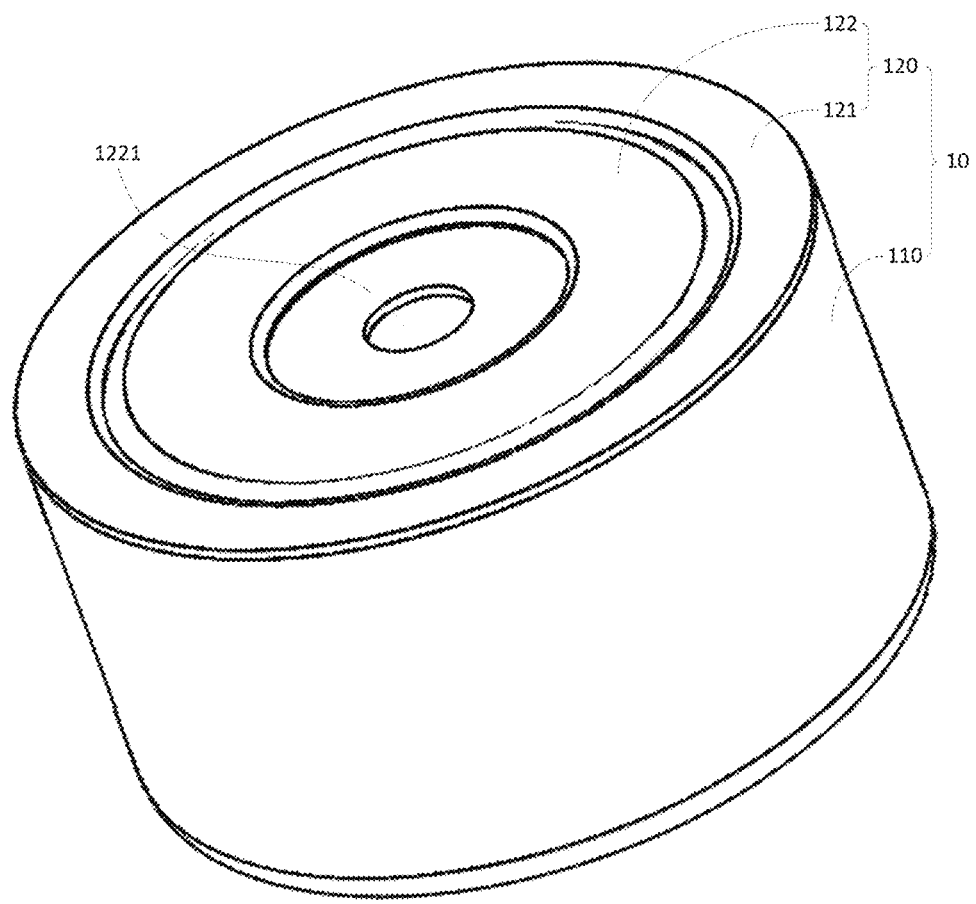
FIG. 6 is a schematic structural diagram of a top cover welded to the housing body as provided by Embodiment 2 of the present disclosure.
Figure 7:
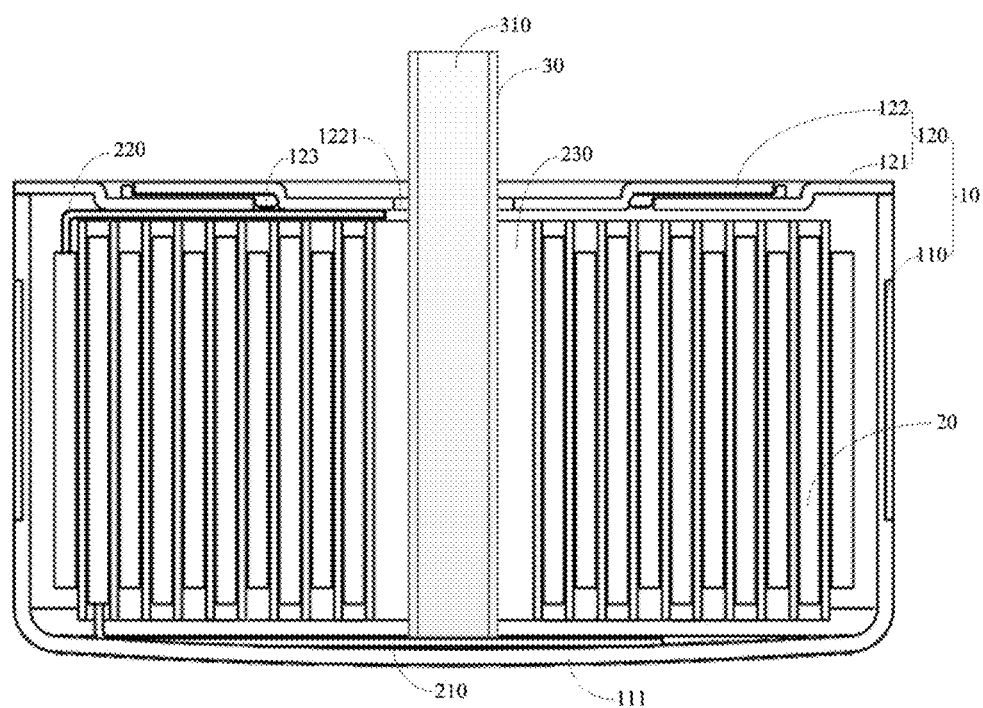
FIG. 7 is a cross-sectional view of a hollow pipe passing through an injection hole and a cavity of the roll core as provided by Embodiment 2 of the present disclosure.

FIG. 4 is a schematic structural diagram of a second tab welded with a top cover and placed into a housing body as provided by Embodiment 2 of the present disclosure; FIG. 5 is a schematic view of a process of loading a roll core into the housing body as provided by Embodiment 2 of the present disclosure; FIG. 6 is a schematic structural diagram of the top cover welded to the housing body as provided by Embodiment 2 of the present disclosure; FIG. 7 is a cross-sectional view of a hollow pipe that passes through an injection hole and a cavity of the roll core as provided by Embodiment 2 of the present disclosure.

Referring to FIG. 4 to FIG. 7, this embodiment provides a preparation method of a button cell, and the preparation method of the button cell includes:

S100: providing a housing 10. As illustrated in FIG. 3, the housing 10 includes a housing body 110 and a top cover assembly 120, where the housing body 110 includes a bottom wall 111 and a side enclosure wall provided along an outer edge of the bottom wall 121 and extending upward, and the top cover assembly 120 is provided with an insulation seal.

S200: providing a roll core 20. As illustrated in FIG. 3, the roll core 20 includes a positive sheet and a negative sheet, a cavity 230 is formed in a center of the roll core 20, and one of the positive sheet and negative sheet is provided with a first tab 210, the other of the positive sheet and negative sheet is provided with a second tab 210, and the second tab 220 and the first tab 210 extend in opposite directions. Where the first tab 210 may be a positive tab and the second tab 220 is a negative tab; or the first tab 210 may be a negative tab and the second tab 220 is a positive tab.

S300: welding the second tab 220 of the roll core 20 to an inner side of the top cover assembly 120, as shown in FIG. 4. In an implementation, the second tab 220 may be welded to the top cover assembly 120 by a laser welding method, so that on one hand, it is beneficial to avoiding deformation of the top cover assembly 120, and on the other hand, it may avoid the formation of a welding mark on an outer surface of the top cover assembly 120. In another implementation, the tab 220 may be welded to the top cover assembly 120 by a welding method such as a resistance welding method. Details would not be repeated here.

S400: placing the roll core 20 in the housing body 110, as shown in FIG. 4. The first tab 210 of the roll core 20 extends toward a direction of the bottom wall 111 of the housing body 110 and is in contact with the bottom wall 111. Specifically, an outer diameter of the roll core 20 may be smaller than an inner diameter of the housing body 110 by 0.2 mm to 0.4 mm, which is, on one hand, beneficial to placing the roll core 20 into the housing body 110; and on the other hand, reserves a space for the expansion of the roll core 20 to avoid excessive internal pressure of the button cell, thereby beneficial to improving the safety performance of the button cell.

It is to be noted that, it is also possible to first place the roll core 20 into the housing body 110, as shown in FIG. 5, and then weld the second tab 220 to the inner side of the top cover assembly 120, as shown in FIG. 4.

Optionally, a distance L1 from a top of the side enclosure wall of the housing body 110 to the welding mark 211 is greater than a length L2 from an end point of the first tab 210 out of the roll core 20 to the welding mark 211. Exemplarily, in FIG. 2, the top of the side enclosure wall is indicated by G, the end point of the first tab 210 out of the roll core 20 is indicated by K, and the welding mark 211 is indicated by O. FIG. 2 illustrates that the first tab 210 is provided outside the roll core 20, so that the end point K of the first tab 210 out of the roll core 20 is also correspondingly located outside the roll core 20.

S500: covering the top cover assembly 120 on the top of the side enclosure wall of the housing body 110 and sealing it with the side enclosure wall, where the top cover assembly 120 is provided with an injection hole 1221, and the injection hole 1221 at least partially overlaps with the cavity 230 of the roll core 20, as shown in FIG. 6. Exemplarily, when the upper cover 121 and the top cover 122 in the top cover assembly 120 have opposite electrical polarities, the upper cover 121 in the top cover assembly 120 and the housing body 110 may be sealed by welding, the welding method for the two may be a resistance welding, a laser welding or other welding method; furthermore, after welding, the sealing of the weld may be tested to ensure the sealing of the button cell, which beneficial to ensuring the quality and performance of the button cell.

S610: welding the first tab 210 with the bottom wall 111 of the housing body 110 by a welding equipment, where energy emitted by the welding equipment and/or an auxiliary tool of the welding equipment pass/passes through the injection hole 1221 and the cavity 230 of the roll core 20.

In the preparation method of the button cell of this embodiment, the top cover assembly 120 is covered on the top of the side enclosure wall of the housing body 110 and is sealed with the side enclosure wall, and meanwhile the injection hole 1221 is provided on the top cover assembly 120, and the injection hole 1221 at least partially overlaps with the cavity 230 of the roll core 20; a part of the welding equipment may extend into the cavity 230 of the roll core 20 from the injection hole 1221 and press against the first tab 210 so as to weld the first tab 210 and the bottom wall 111 of the housing body together, that is, the welding mark between the first tab 210 and the bottom wall 111 is located in a portion where the bottom wall 111 overlaps with the cavity 230 and the injection hole 1221.

Compared with the method of welding the first tab and the bottom wall of the housing body from top to bottom before the top cover is closed in the prior art, in the welding method of this embodiment, on one hand, the existence of the top cover assembly 120 can not only protect a top surface of the roll core 20, but also press the roll core 20 in the housing body 110 to prevent the roll core 20 from shaking, which effectively prevents the welding equipment from accidentally damaging the roll core 20 during the welding process, and thus is beneficial to ensuring the quality and performance of the button cell meet the requirements, and meanwhile beneficial to improvement of the yield and production efficiency of button cell.

Where the implementation of step S610 includes but is not limited to the following three:

A first possible implementation is that the welding equipment is a resistance welding equipment, and a welding pin of the resistance welding equipment can pass through the injection hole 1221 and the cavity 230 of the roll core 20 to press and weld the first tab 210 to the bottom wall 111 of the housing body 110, thereby ensuring the reliability. Subsequently, energy of the welding equipment is transferred to a surface of the first tab 210 through the welding pin, so as to weld the first tab 210 and the bottom wall 111 of the housing body together. After the welding is completed, the surface of the first tab may be formed with a spot-like welding mark, the number of the spot-like welding mark is 1 to 3, and a diameter of the spot-like welding mark is between 0.5 mm and 2 mm; at the same time, the outer surface of the housing body has no welding mark, keeping the surface smooth.

As a result, the welding pin of the resistance welding equipment can pass through the injection hole 1221 and the cavity 230 of the roll core 20 to press the first tab 210 and the bottom wall 111 of the housing body, so that the reliability of the welding between the first tab 210 and the bottom wall 111 of the housing body can be ensured, which avoids a pseudo welding caused by insufficient attachment between the first tab 210 and the bottom wall 111 of the housing body, and thus is beneficial to ensuring the quality and performance of the button cell.

A second possible implementation is that the welding equipment includes a laser welding equipment and a hollow pipe 30, and the hollow pipe 30 can pass through the injection hole 1221 and the cavity 230 of the roll core 20 to press the first tab 210 against the bottom wall 111 of the housing body 110; laser emitted by the laser welding equipment can pass through an inner cavity 310 of the hollow pipe 30 and is irradiated on the first tab 210 to weld the first tab 210 and the bottom wall 111 of the housing body together. After the welding is completed, spot-like welding marks may be formed on the surface of the first tab, outlines of the spot-like welding marks are circular, the number of the spot-like welding marks is greater than or equal to 2, and diameters of the spot-like welding marks are greater than or equal to 50 μm; at the same time, the outer surface of the housing body has no welding mark, keeping the surface smooth.

The hollow pipe 30 passing through the injection hole 1221 and the cavity 230, on one hand, can be used to press the first tab 210 against the bottom wall 111 of the housing body 110 to prevent the quality and performance of the button cell from being affected by a pseudo welding caused by insufficient attachment between the first tab 210 and the bottom wall 111 of the housing body; on the other hand, it can separate the laser from the roll core 20, and guide the laser, which can not only prevent the laser from accidentally damaging the roll core 20, but also avoid the laser to be irradiated on other position outside the welding area.

A third possible implementation is that the welding equipment includes a laser welding equipment and a welding auxiliary part, and the welding auxiliary part can pass through the injection hole 1221 and the cavity 230 of the roll core 20 to press the first tab 210 against the bottom wall 111 of the housing body 110; the laser welding equipment can weld from the bottom of the housing body 110 to weld the bottom wall 111 of the housing body 110 and the first tab 210 together. After the welding is completed, spot-like welding marks can be formed on a surface of the bottom wall of the housing body, outlines of the spot-like welding marks are circular, the number of the spot-like welding marks is greater than or equal to 2, and diameters of the spot-like welding marks are greater than or equal to 50 μm; at the same time, the surface of the first tab has no welding mark, keeping the surface smooth.

The welding auxiliary part passing through the injection hole 1221 and the cavity 230, on one hand, can be used to press the first tab 210 against the bottom wall 111 of the housing body 110 to prevent the quality and performance of the button cell from being affected by a pseudo welding caused by insufficient attachment between the first tab 210 and the bottom wall 111 of the housing body; on the other hand, it can further avoid the laser welding equipment to accidentally damage the roll core 20 when the laser welding equipment performs welding form outside of the housing body 110.

It is to be noted that it is also possible in some cases to weld directly with the laser welding equipment instead of using the hollow pipe or the auxiliary welding part. For example, the laser directly is irradiated on a position where the first tab 210 is attached to the bottom wall 111 of the housing body 110 from above the injection hole 1221 or from below the bottom wall 111 so as to weld the first tab 210 and the bottom wall 111 together.

Embodiment 3

This embodiment provides an electronic product including a button cell.

The button cell in this embodiment has the same structure as that provided in Embodiment 1, and can bring the same or similar technical effects. Details would not be repeated here, and specific reference can be made to the description of the above embodiments.

In the description of the present disclosure, it should be understood that an orientation or a position relationship indicated by terms "top", "bottom", "upper", "lower" (if any) etc. is based the orientation or a positional relationship shown in the accompanying drawings, and is intended only for convenience of describing the present disclosure and simplifying the description, rather than indicating or implying that the referred device or element must have a specific orientation, or be constructed and operated in a specific orientation, and therefore it should not be understood as a limitation to the present disclosure.

In the description of the present disclosure, it should be noted that, unless otherwise expressly specified and limited, terms "install", "connect" and "connected" should be understood in a broad sense, for example, it may be a fixed connection, a detachable connection, or an integral connection; it can be a mechanical connection or an electrical connection; it can be a direct connection, an indirect connection through an intermediate medium, or an internal communication of two elements. For those of ordinary skill in the art, the specific meanings of the above terms in the present disclosure can be understood through specific situations.

Terms "first" and "second" as used in the description and claims of the present application and the above description of the accompanying drawings are used to distinguish similar objects, and are not necessarily used to describe a specific order or sequence. It should be understood that data thus used may be interchanged in appropriate cases, such that the embodiments of the present application described herein can, for example, be practiced in an order other than those illustrated or described herein.

Finally, it should be noted that the above embodiments are only used to illustrate the technical solutions of the present application, but not to limit them; although the present disclosure is illustrated in detail with reference to the above embodiments, those of ordinary skill in the art should understand that the technical solutions described in the above embodiments may still be modified or some or all of the technical features therein may be equivalently replaced; and these modifications or replacements do not make the essence of the corresponding technical solutions deviate from the scope of the technical solutions of the embodiments of the present application.

What is claimed is:

1. A button cell, comprising a housing and a roll core;
the housing comprises a housing body and a top cover assembly, wherein the housing body comprises a bottom wall and a side enclosure wall provided along an outer edge of the bottom wall and extending upward, the top cover assembly is covered on a top of the side enclosure wall and sealed with the side enclosure wall, and the housing body and the top cover assembly jointly enclose an accommodating cavity for accommodating the roll core;
the roll core comprises a positive sheet and a negative sheet, a cavity is formed in a center of the roll core, one of the positive sheet and the negative sheet is provided with a first tab extending toward a direction of the bottom wall, and the other of the positive sheet and the negative sheet is provided with a second tab extending toward a direction opposite to the direction of the bottom wall, the first tab is welded to the bottom wall of the housing body, and the second tab is welded to an inner side of the top cover assembly; and the top cover assembly is provided with an injection hole, the injection hole at least partially overlaps with the cavity of the roll core; a welding mark between the first tab and the bottom wall is located within a portion where the bottom wall overlaps with the cavity and the injection hole.

2. The button cell according to claim 1, wherein a distance from the top of the side enclosure wall to the welding mark is greater than a length from an end point of the first tab out of the roll core to the welding mark.

3. The button cell according to claim 2, wherein the top cover assembly includes an upper cover and a top cover;

an outer edge of the upper cover is welded with the side enclosure wall, an inner edge of the upper cover is lapped to an outer edge of the top cover, and an insulation seal is sandwiched between the inner edge of the upper cover and the outer edge of the top cover; and the second tab is welded with an inner side of the top cover, and the injection hole is located on the top cover.

4. The button cell according to claim 2, wherein the bottom wall of the housing body protrudes downward to form a convex surface.

5. The button cell according to claim 1, wherein a welding area of the first tab facing away from the bottom wall of the housing body has a welding mark, which does not extend to a surface of the bottom wall of the housing body facing away the first tab; or a welding area of the bottom wall of the housing body facing away from the first tab has a welding mark, which does not extend to a surface of the first tab facing away the bottom wall of the housing body.

6. The button cell according to claim 5, wherein the top cover assembly includes an upper cover and a top cover;

an outer edge of the upper cover is welded with the side enclosure wall, an inner edge of the upper cover is lapped to an outer edge of the top cover, and an insulation seal is sandwiched between the inner edge of the upper cover and the outer edge of the top cover; and the second tab is welded with an inner side of the top cover, and the injection hole is located on the top cover.

7. The button cell according to claim 5, wherein the bottom wall of the housing body protrudes downward to form a convex surface.

8. The button cell according to claim 1, wherein an insulation hollow pipe is sleeved in the cavity of the roll core, a top of the insulation hollow pipe abuts against the top cover assembly, and a bottom of the insulation hollow pipe abuts against the first tab; and the injection hole at least partially overlaps with a top opening of the insulation hollow pipe.

9. The button cell according to claim 8, wherein the insulation hollow pipe is a rubber hollow pipe; and/or a pipe wall of the insulation hollow pipe is provided with a through hole.

10. The button cell according to claim 9, wherein the top cover assembly includes an upper cover and a top cover;

an outer edge of the upper cover is welded with the side enclosure wall, an inner edge of the upper cover is lapped to an outer edge of the top cover, and an insulation seal is sandwiched between the inner edge of the upper cover and the outer edge of the top cover; and the second tab is welded with an inner side of the top cover, and the injection hole is located on the top cover.

11. The button cell according to claim 8, wherein the insulation hollow pipe, the injection hole, and the cavity of the roll core are arranged coaxially, and an inner diameter of the insulation hollow pipe is greater than a diameter of the injection hole.

12. The button cell according to claim 11, wherein the top cover assembly includes an upper cover and a top cover;

an outer edge of the upper cover is welded with the side enclosure wall, an inner edge of the upper cover is lapped to an outer edge of the top cover, and an insulation seal is sandwiched between the inner edge of the upper cover and the outer edge of the top cover; and the second tab is welded with an inner side of the top cover, and the injection hole is located on the top cover.

13. The button cell according to claim 8, wherein the top cover assembly includes an upper cover and a top cover;

an outer edge of the upper cover is welded with the side enclosure wall, an inner edge of the upper cover is lapped to an outer edge of the top cover, and an insulation seal is sandwiched between the inner edge of the upper cover and the outer edge of the top cover; and the second tab is welded with an inner side of the top cover, and the injection hole is located on the top cover.

14. The button cell according to claim 1, wherein the top cover assembly includes an upper cover and a top cover;

an outer edge of the upper cover is welded with the side enclosure wall, an inner edge of the upper cover is lapped to an outer edge of the top cover, and an insulation seal is sandwiched between the inner edge of the upper cover and the outer edge of the top cover; and the second tab is welded with an inner side of the top cover, and the injection hole is located on the top cover.

15. The button cell according to claim 14, wherein a seam where the upper cover is lapped to the top cover is coated with a sealant.

16. The button cell according to claim 1, wherein the bottom wall of the housing body protrudes downward to form a convex surface.

* * * * *